United States Patent [19]

Martindell

[11] Patent Number: 4,692,073
[45] Date of Patent: Sep. 8, 1987

[54] HANDLE ADAPTER AND CHUCK APPARATUS FOR POWER BITS

[76] Inventor: J. Richard Martindell, P.O. Box 490, Hill Rd., Bernalillo, N. Mex. 87004

[21] Appl. No.: 880,811

[22] Filed: Jul. 1, 1986

Related U.S. Application Data

[63] Continuation of Ser. No. 704,949, Feb. 25, 1985, abandoned.

[51] Int. Cl.$^4$ ............................................. B23B 31/22
[52] U.S. Cl. ................... 408/239 A; 81/438; 279/1 B; 279/75; 279/80; 279/82
[58] Field of Search ................. 81/436, 437, 438, 439; 279/1 B, 76, 1 A, 74, 75, 78, 79, 80, 82, 30, 57; 408/239 R, 239 A

[56] References Cited

U.S. PATENT DOCUMENTS

| | | |
|---|---|---|
| 2,472,392 | 6/1949 | Alexander ........................ 279/76 X |
| 3,392,767 | 7/1968 | Stillwagon, Jr. ................. 81/438 X |
| 3,652,099 | 3/1972 | Bilz ..................................... 279/1 B |
| 4,309,042 | 1/1982 | Faith et al. ...................... 279/82 X |
| 4,577,875 | 3/1986 | Miyakawa .............................. 279/75 |

Primary Examiner—Gil Weidenfeld
Assistant Examiner—Glenn Webb
Attorney, Agent, or Firm—H. Gordon Shields

[57] ABSTRACT

Handle adapter and chuck apparatus for a power bit includes a quick release chuck having a spindle with a longitudinally extending bore in the spindle adapted to receive the shank of the power bit. A radially extending bore extends through the spindle and communicates with the bore. A ball is disposed in the bore and contacts a portion of the shank of the power bit disposed in the bore. A spring biased sleeve is disposed about the spindle and includes a tapered bore which bears against the ball to bias the ball against the shank of the tool.

19 Claims, 7 Drawing Figures

U.S. Patent  Sep. 8, 1987  Sheet 1 of 2  4,692,073
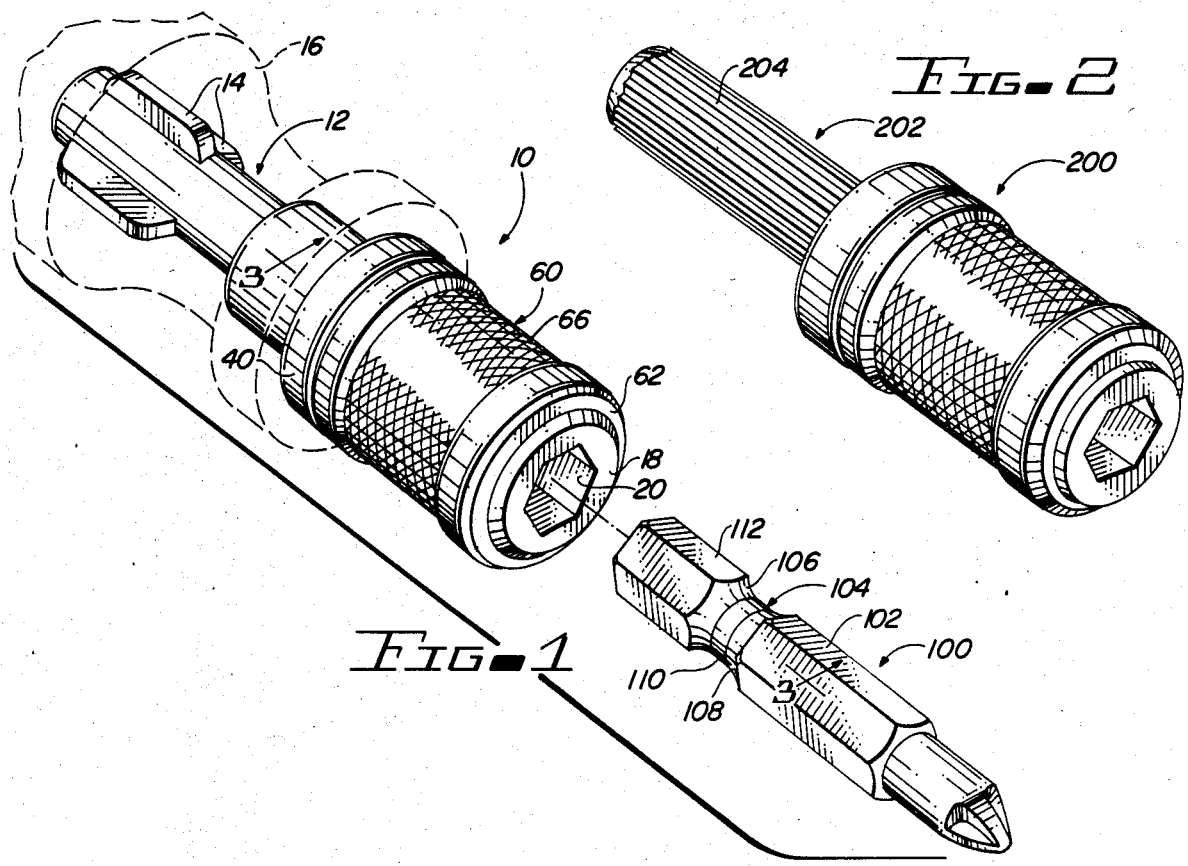
FIG-1
FIG-2
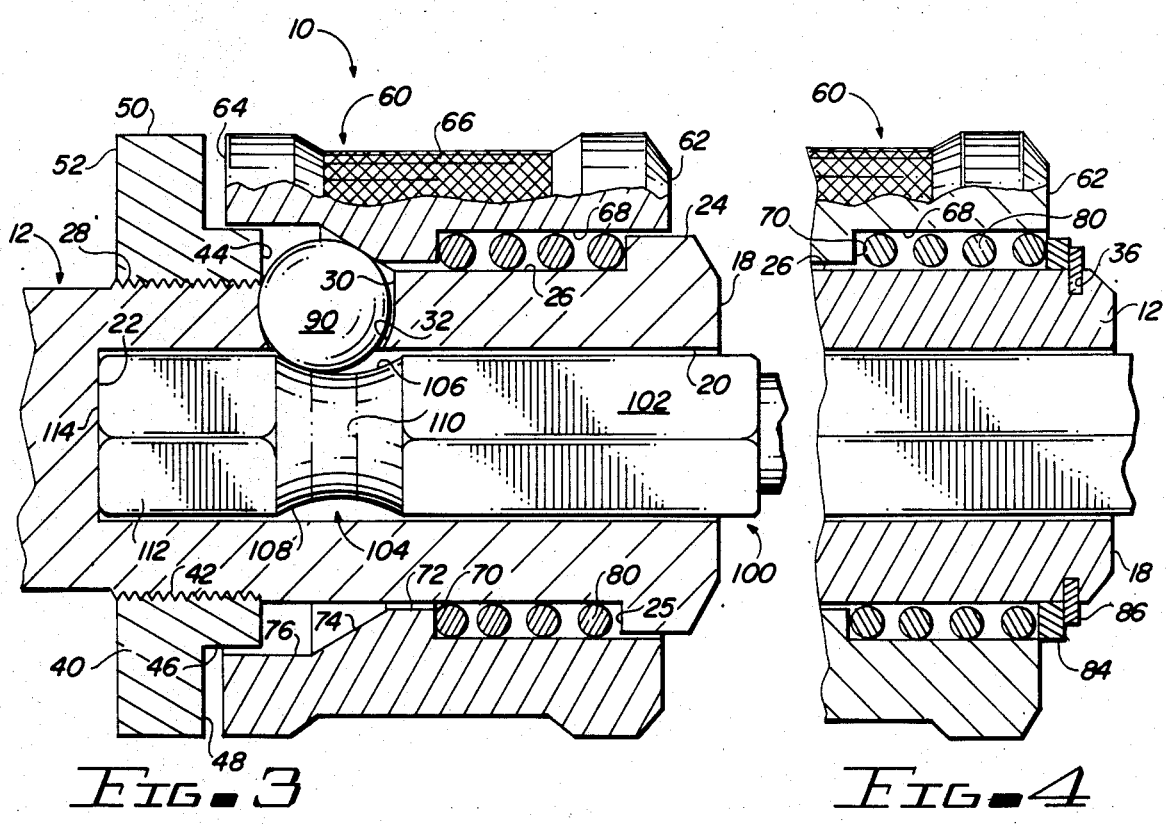
FIG-3
FIG-4

HANDLE ADAPTER AND CHUCK APPARATUS FOR POWER BITS

This is a continuation of application Ser. No. 704,949, filed Feb. 25, 1985, now abandoned.

BACKGROUND OF THE INVENTION

1. Field of the Invention

This invention relates to power tool handles and, more particularly, to a handle for manually using a power bit and having a quick release chuck for securing the power bit to the handle.

2. Description of the Prior Art

The term "power bit" refers to elements typically used for driving fastener devices, such as screws, nuts, and bolts. The most commonly used power bits generally have a hexagonally configured shank and a groove extending about the shank with a flat portion disposed at the bottom of the groove between two radiused portions. Such power bits have been used since at least 1930, adn their use has increased substantially in recent years. The American National Standards Institute has a specification for such tools known as ANSI B107.4-1973. The standard refers to driving and spindle ends for power bits for portable hand, air, and electric tools.

The power bits are typically used with electric and air driven tools, but the use of manual hand tools with such power bits is virtually nil, even though the use of power bits with hand-held power tools goes back in time more than fifty years, and during that long time period the number of tools or tool bits accumulated in the field is enormous. In the known prior art dealing with power tool holding devices for power bits, there are primarily two types of chucks used. One type is a quick release type having apparatus similar to that in U.S. Pat. No. 4,184,692, which patent will be discussed below.

The similar, but not shown, quick release chuck utilizes a ball retained in a groove in the shank of the power bit. The ball is trapped between a spring biased movable sleeve and the bottom surface of the tool groove. In this configuration, the ball is free to move in and out radially with respect to the longitudinally axis of the tool because of necessary manufacturing tolerances and clearances. It is additionally free to move in the axial direction by virtue of a flat on the bottom of the groove as specified in the aforementioned ANSI standard. The ball is accordingly loose and free to move both axially and radially. Positive holding of the tool against an extraction force is not accomplished until sufficient axial movement of the tool has taken place to wedge the ball between the back radius of the tool groove and the surface of the sleeve bore. On a one-fourth inch hexagonal power bit this can exceed one-tenth inch. This distance has been confirmed by measurement on currently manufactured quick release chucks of this type. This looseness is objectionable on a hand tool.

The second type of holder is a non-quick release type. U.S. Pat. No. 3,726,533 discloses one such chuck. A pin is trapped in the groove in the power bit shank to provide a frictional force on the bit. In the alternative, a ball may be loaded by an annular split spring or by a coil spring to press against the bottom of the groove in the power bit shank. The force against the pin or ball acts only radially inwardly against the bit, and thus also allows longitudinal movement of the bit in the chuck. As the pin or ball contacts the radius of the tool groove, normal forces develop on the radius which tend to hold the tool against further longitudinal or axial movement. For spring biased balls, when the radial component on the ball exceeds the spring force, the tool bit will break loose.

It will be noted that a spring force high enough to dampen the longitudinal movement of the bit will also require very high axial extraction forces to remove a power bit and to insert another bit. Usually another tool, such as pliers or even a vise, may be required for such removal and insertion, unless the spring force can be reduced for the insertion and removal steps.

Examples of quick release chucks similar in principal to the quick release chuck discussed above, with reference to U.S. Pat. No. 4,184,692, are U.S. Pat. Nos. 1,602,708 and 2,618,940. The feature common to these patents is a detenting ball which is entrapped between a sleeve and a recess. However, the ball is loose and is without constant bias.

The '692 and '708 patents utilize a plurality of balls detenting into dimples in a cylindrical tool shank. The dimples and trapped ball provide resistance to both rotational and lateral movement of the tool relative to the spindle of the chuck, but only after tolerance and clearance spacing is taken up. The '940 patent likewise utilizes a plurality of balls trapped by a sleeve in a groove. A spline is utilized for rotational locking.

The following are examples of quick change chucks which utilize frictional forces alone on the surface of a tool shank. These are characterized by a ball or by a plurality of balls biased by a camming surface on a spring actuated sleeve against a non-detented surface on the tool or part to be held. The resulting force is a purely normal force, acting entirely in a radial direction, with no component in the axial direction. This creates a purely frictional force on the tool or part to be held. Obviously, this is a non-positive holding force which will release when the pull out force exceeds the essentially constant frictional force. U.S. Pat. Nos. 945,603, 3,521,895 and 3,762,732 are examples of these characteristics.

U.S. Pat. Nos. 3,893,677 and 4,395,051 are examples of quick change tool holders for power driven spindles which utilize a plurality of balls biased against tool holder surfaces which are configured such that under a pull out force, the normal force on the tool holder has a component in the axial direction. The tangential and normal forces between the tool holder and the sleeve combine to create a wedging or locking action.

U.S. Pat. No. 4,202,557 utilizes a spring bias a sleeve. The sleeve applies pressure against a wedge or drive member to hold a tool in place.

It will be noted that most of the above-discussed patents refer to large power tool chucks, as opposed to hand tool holders or chucks. Moreover, in most cases, movement of the tools in longitudinal or axial directions is not a problem. However, in hand tool usage, axial movement is very much of a problem, and is accordingly very undesirable.

Some of the prior art patents disclose, in non-tool or non-hand tool environments, wedging lock systems in which no axial movement takes place. However, none of those type locking systems is directly applicable or adaptable to hand tools.

The apparatus of the present invention is designed for hand tool usage. Axial movement does not occur.

The apparatus of the present invention uses a combination of normal and tangential forces to hold a power bit tool in place within a chuck of a handle for a hand tool. The normal and tangential forces, as applied by the apparatus of the present invention, securely lock the tool bit in place to a handle without allowing longitudinally or axial movement of the bit.

SUMMARY OF THE INVENTION

The invention described and claimed herein comprises a handle adapter for a power bit to enable a power bit to be used manually. The handle adapter has a quick release chuck which includes a spring biased sleeve having an inclined cam surface disposed against a ball, and the ball in turn applies normal and tangential forces against a groove in the shank of the power bit to hold the power bit in a bore. The sleeve is urged into contact with the ball by a compression spring disposed between a spindle and the sleeve. A ring secured to the spindle limits the movement of the sleeve in one direction, and the compression spring and the spindle limit the movement of the sleeve in the opposite direction. Through the cam surface, normal and tangential forces are applied by the ball against the groove in the power bit shank to hold the power bit shank firmly in the bore to secure the handle to the power bit. The holding action accomplishes a locking of the bit in place without allowing or permitting any longitudinal or axial movement.

Among the objects of the present invention are the following:

To provide new and useful hand tool apparatus for holding a power bit;

To provide a new and useful handle apparatus having a quick release chuck for holding a power bit;

To provide new and useful handle apparatus for holding a power bit through a spring biased sleeve having a tapered surface disposed against a ball contacting the power bit;

To provide new and useful adapter apparatus for holding a power bit;

To provide new and useful adapter apparatus having a quick release chuck for holding a tool bit;

To provide new and useful tool holder apparatus in which a ball is biased against the shank of a tool by a tapered and spring biased surface; and To provide new and useful handle apparatus in which a ball applies normal and tangential forces against a groove in a power bit to secure the power bit in a bore and handle.

BRIEF DESCRIPTION OF THE DRAWING

FIG. 1 is a perspective view of the apparatus of the present invention and a power bit usable therewith.

FIG. 2 is a perspective view of an alternate embodiment of a portion of the apparatus of the present invention.

FIG. 3 is a view in partial section taken generally along line 3—3 of FIG. 1.

FIG. 4 is a view in partial section of an alternate embodiment of a portion of the apparatus of FIG. 3.

DESCRIPTION OF THE PREFERRED EMBODIMENT

Figure 5A:
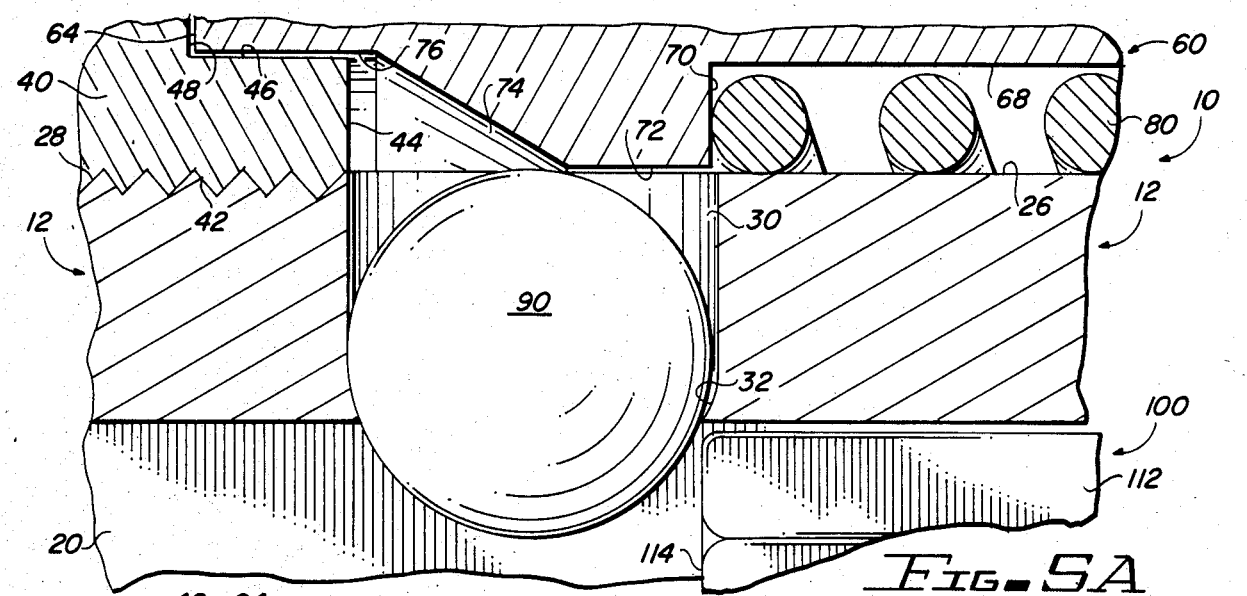
FIGS. 5A, 5B, and 5C are enlarged views in partial section of a portion of the apparatus of the present invention illustrating the operation thereof.

FIG. 1 is a perspective view of handle adapter and chuck apparatus 10 of the present invention. The handle and chuck apparatus 10 is shown spaced apart from a tool bit 100 which is usable with the apparatus 10. The apparatus 10 includes a spindle 12. At the rear end of the spindle 12 are a plurality of radially outwardly extending ears 14. The ears 14 engage the handle grip 16, shown generally in phantom, to prevent the relative rotation of the handle grip 16 and the spindle 12.

The spindle 12 includes a front end 18 which is generally perpendicular to the longitudinal axis of the spindle 12. Extending rearwardly from the front end or front face 18 is an internal bore 20. The internal bore 20 is illustrated as being of a hexagonal configuration. The tool bit 100 includes a hexagonal shank 102 which is adapted to be received into, or to extend into, the hexagonal bore 20.

FIG. 2 is a perspective view of alternate apparatus 200 of the present invention, which is substantially identical to the embodiment of FIG. 1 except for a plurality of longitudinally axially extending flutes 204 at the rear portion of a spindle 202 in place of the ears 14. The flutes 204 perform substantially the same function as the ears 14, namely preventing relative movement between the spindle and the handle grip (not shown in FIG. 2).

FIG. 3 is a view in partial section taken generally along line 3—3 of FIG. 1, showing the tool bit 100 disposed within the bore 20 of the spindle 12. FIG. 4 is a view in partial section of an alternate embodiment of a portion of the spindle 12 illustrated in FIG. 3.

Figure 5B:
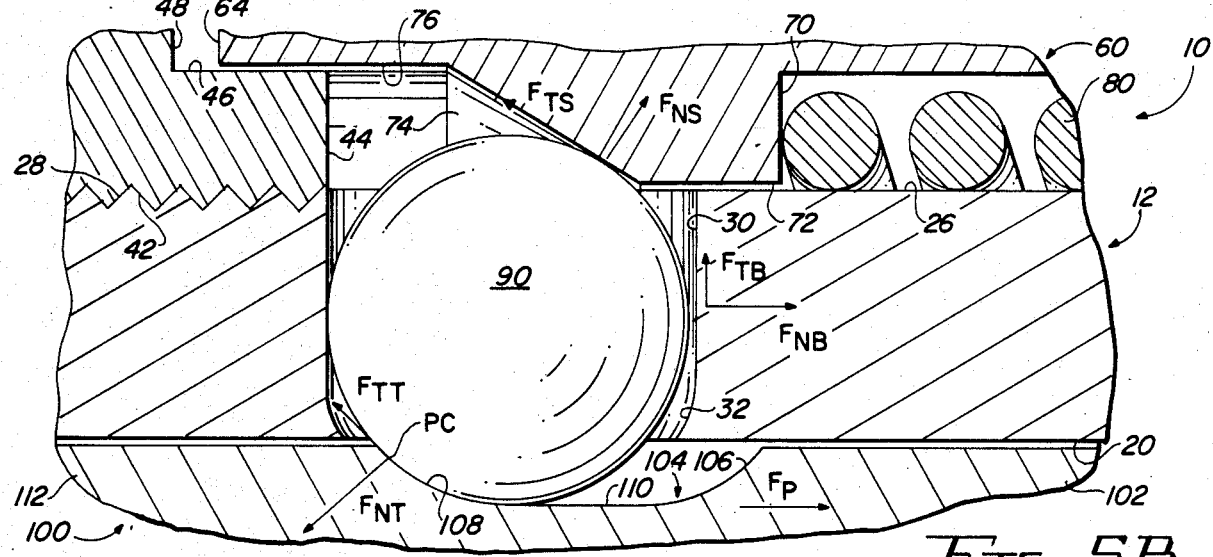
Figure 5C:
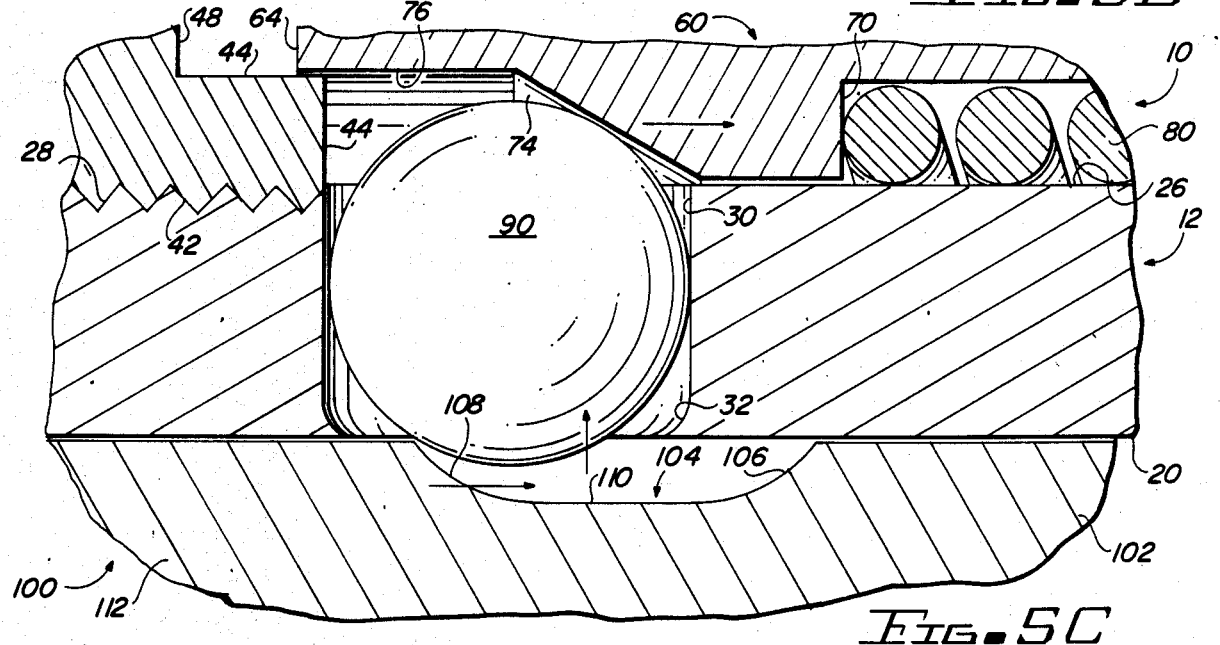

FIGS. 5A, 5B, and 5C are enlarged views in partial section showing the operation of the apparatus 10 of the present invention. For the following discussion, reference will primarily be made to FIGS. 1, 3, and 5A, 5B, and 5C. Further references to FIGS. 2 and 4 will be specific to those embodiments.

The hexagonally shaped internal bore 20 extends rearwardly from the front end 18 of the spindle 12. The longitudinal axis of the bore 20 is substantially aligned with the longitudinal axis of the spindle 12. The front end 18, which defines a front face, is substantially perpendicular to the longitudinal axis of both the spindle 12 and the bore 20.

The bore 20 includes a rear end 22. The rear end 22 defines a rear face which is substantially perpendicular to the longitudinal axis of the bore 20 and is substantially parallel to the front end or face 18 of the spindle 12.

Extending radially inwardly on the spindle 12 from a front cylindrical portion 24 is a shoulder 25. The cylindrical portion 24 and the shoulder 25 are disposed just rearwardly of the front end 18. Rearwardly of the shoulder 25 is a circular or cylindrical portion 26. The diameter of the cylindrical portion 26 is less than the diameter of the front cylindrical portion 24. Rearwardly of the cylindrical portion 26 is an externally threaded portion 28.

At about the juncture of the threaded portion 28 and the circular or cylindrical surface 26 is a radially extending bore 30. The bore 30 communicates with the bore 20. The bore 30 extends through the cylindrical portion 26 of the spindle 14.

At the juncture of the bores 20 and 30 there is a retainer lip 32. The retainer lip 32 extends inwardly to decrease the diameter of the radial bore 30 at the juncture of the bores 20 and 30. A ball 90 is disposed in the bore 30 and is retained in the bore 30 by the retainer lip 32, or is prevented from falling out of the bore 30 by the lip 32. However, as shown in FIG. 5A, the lip 32 allows the ball 90 to extend a substantial distance into the bore 20.

The diameter of the ball 90 is slightly less than the diameter of the radial bore 30. There is accordingly very little side-to-side movement of the ball 90. However, the ball 90 moves axially in the bore 30, as will be discussed below. The axis of the bore 90 is substantially perpendicular to, and is centered on, one of the haxagonal flats or faces of the bore 20.

A ring 40 is disposed about the spindle 12 on the threaded portion 28. The ring 40 includes an internally threaded bore 42 which threadedly engages the externally threaded portion 28 of the spindle 12.

At the front of the ring 40 is a front face 44. The front face 44 is substantially perpendicular to the longitudinal axis of the spindle 12. Extending rearwardly from the front face 44 is a relatively short cylindrical portion 46. At the rear of the cylindrical portion 46 is a radially outwardly extending shoulder 48. Another cylindrical portion 50 extends rearwardly from the shoulder 48. A rear face 52 extends from the outer cylindrical portion 50 to the threaded bore 42. The rear face 52 is substantially parallel to the front face 44.

After the ring 40 is secured to the spindle 12, by the threaded engagement of the threads 28 and 42, the handle grip 16 is applied to the spindle 12. The front portion of the handle grip 16 is disposed against the rear face 52 of the ring 50.

A movable sleeve 60 is disposed about the spindle 12 and forwardly of the ring 40. The sleeve 60 includes a front end face 62. The face 62 is substantially perpendicular to the longitudinal axis of the spindle 12, as are the outer faces or front and rear surfaces as indicated herein. Parallel to the front end face 62 is a rear end face 64. The rear end face 64 is facing the shoulder 48 of the ring 40.

Between the front end face 62 and the rear end face 64 is a cylindrical center section or portion 66. The outer surface of the cylindrical portion 66 is preferably knurled for easy gripping by a user of the apparatus 10. Relatively short cylindrical portions are disposed between the center cylindrical portion 66 and the faces 62 and 64. The relatively short cylindrical portions have diameters preferably slightly greater than the diameter of the center cylindrical portion 66.

Within the sleeve 60 is a front bore 68. The bore 68 extends rearwardly from the front face 62. The diameter of the bore 68 is slightly larger than that of the relatively short cylindrical portion 24 of the spindle 12, and the diameter of the bore 68 is accordingly substantially larger than that of the circular or cylindrical surface 26 of the spindle 12.

At the rear of the bore 68, remote from the front end face 62, is a radially inwardly extending shoulder 70. The shoulder 70 extends between the front bore 68 and a center bore 72. The diameter of the center bore 72 is slightly larger than that of the cylindrical portion 26 of spindle 12. The center bore 72 extends rearwardly from the shoulder 70 a relatively short distance.

Extending rearwardly from the center bore 72 is conically tapered bore 74. The conical bore 74 tapers outwardly and rearwardly from the center bore 72 to an enlarged diameter rear cylindrical bore 76. The diameter of the cylindrical bore 76 is slightly greater than that of the cylindrical portion 46 of the ring 40. The cylindrical portion 46 of the ring 40 is disposed partially within the bore 76.

A compression spring 80 extends between the shoulder 25 of the spindle 12 and the shoulder 70 of the sleeve 60. The spring 80 is disposed about the cylindrical portion 26 of the spindle 12, and within the front bore 68 of the sleeve 60. The spring 80 urges the sleeve 60 rearwardly against the shoulder 48 of the ring 40.

The diameter of the ball 90, which ball is disposed within the radially extending bore 30 of the spindle 12, is substantially greater than the thickness of the cylindrical portion of the spindle 12 through which the bore extends. It follows that the diameter of the bore 30 is greater than the overall length of the bore. The ball 90 accordingly extends partially out of the bore 30 and into the bores 74 and 76 of the sleeve 60, partially into the hexagonal bore 20 of the spindle 12.

Under the urging of the compression spring 80, the conically tapered surface 74 of the sleeve 60 urges, by a spring 80, the ball 90 downwardly through the bore 30 of the sleeve 12 and into the hexagonally configured internal bore 20. Under the urging or bias of the spring 80, the ball 90 is cammed downwardly by the conical surface 74 until the ball is stopped in its radially inward or downward movement into the bore 20 by the retainer lip 32 of by a tool bit, such as the tool bit 100, disposed within the bore 20.

In the embodiment of FIG. 4, the shoulder 25 of the spindle 12 is substantially eliminated, and the cylindrical surface 26 accordingly extends forwardly to the front face 18. A groove 36 extends radially inwardly into the spindle 12 just rearwardly of the front face 18 and at the front part of cylindrical surface 26.

To retain the compression spring 80 on the cylindrical surface 26, a flat washer 84 is disposed about the cylindrical surface 26 of the spindle 20 and is retained there by a fastener, such as a retainer ring 86, which may be a "C" ring, a circlip, etc. The spring 80 accordingly extends between the washer 84 and the shoulder 70 of the sleeve 60.

The tool bit 100 may be any appropriate power bit in common usage. Such power bits are hexagonally configured and are adapted to be used primarily with power tools, such as electrical or air driven tools. Such power bits generally comply with the American National Standards Institute Specification ANSI B107.4-1973. Such power bits include a hexagonal shank and a circumferentially extending groove. The bit 100 includes a hexagonal shank 102 and a radially inwardly extending circumferential groove 104. The groove 104 is of a predetermined width and a predetermined depth. The groove 104 includes a pair of radius portions 106 and 108, and a bottom flat 110 between the radius portions 106 and 108. At the rear end of the tool bit 100 is a rear face 114. Between the groove 104 and the rear face 114 is a rear shank portion 112.

The distance between the rear face or end 114 of the tool bit shank 102 and the groove 104 is, like the dimensions of the groove 104, including the radii 106 and 108 and the flat 110, set forth in the ANSI specification identified above. The tool apparatus 10 is dimensioned generally in accordance with the same ANSI specification. An important exception, however, is the distance between the location of the radial bore 30 and back surface 22 of the bore 20. The dimension between the radial bore 30 and the back surface 22 of the bore 20 has been reduced to assure that the ball 90 bears against the rear radius 108 of the groove 104. This is of fundamental importance in achieving the locking action described herein.

The correlation of the dimensions of both the tool bit 100 and the apparatus 10 results in the ball 90 bearing against the rear radius 108 of the groove 104, or against its upper extremity at the juncture of the radius 108 and the exterior of the rear shank portion 112. The ball 90 accordingly extends into the groove 104 and against the rear radius 108 of the tool bit 102 to hold the tool bit 100 in the bore 20.

The insertion, removal, and locking of the shank 102 of the tool bit 100 is illustrated in FIGS. 5A, 5B, and 5C.

With the power bit 100 removed from the bore 20, the ball 90 extends downwardly into the bore 20 from the radial bore 30. The ball 90 extends downwardly a predetermined distance into the bore 20 according to the limitations of the retainer lip 32 at the juncture of the bore 30 and the bore 20. This is best shown in FIG. 5A. The ball 90 is cammed into that position in response to the urging of the spring 80 against the shoulder 70 of the sleeve 60.

In order to insert or to remove the power bit 100 from the bore 20, the sleeve 60 is moved manually forwardly against the urging of the spring 80 so that the bore 72 is moved from the ball 90 to allow the ball 90 to move upwardly into the conical bore 74 and the cylindrical bore 76 of the sleeve 60. The ball 90 is moved substantially completely outwardly from the bore 20 and into the radial bore 30 and into the bores 74 and 76 by the camming contract of the end 114 of the tool shank 102 as the power bit 100 is inserted into the bore 20. When the tool 100 is inserted fully into the bore 20, the rear end 114 of the shank 102 is disposed against the rear wall or face 22 of the bore 20, as shown best in FIG. 3.

When the sleeve 60 is released by the user of the apparatus 10 after the tool bit is in place in the bore 20, the compression spring 80 urges the sleeve 60 rearwardly. Under the rearward bias of the sleeve 60, the conical bore 74 of the sleeve 60 cams the ball 90 radially inwardly through the bore 30 and into the groove 104 against the radius 108 at the rear end of the groove 104 of the tool shank 102. The contact between the sleeve 60, the ball 90, and the tool or power bit 100 causes both frictional and normal forces to act on the tool 100 to hold the tool bit 100 securely in the spindle 12 of the tool 10 and to prevent movement of the tool bit within the bore 20.

It will be noted that the compression spring 80 need not be a very strong spring. A relatively light spring is sufficient to provide the necessary bias between the sleeve 60 and the spindle 12, and against the ball 90, to securely lock the power bit 100 within the internal bore 20 of the tool 10. The frictional and normal forces applied are sufficient to cause the tool bit or power bit 100 to be locked or held securely in the bore 20. In actuality, the greater the longitudinally outward pull on the tool bit 100, the greater are the lockup forces acting through the ball 90 between the spindle 12 and the sleeve 60 against the radius 108 of the tool shank 102 to secure the tool bit 100 within the bore 20.

As shown in FIG. 5B, when the shank 102 of the tool 100 is disposed fully within the bore 20, and the sleeve 60 is released so that its conical bore 74 is providing a rearward camming bias against the top or outer portion of the ball 90, the ball 90 contacts the rear surface of the bore 30 and the radius 108. Depending on the distance between the bore 30 and the end 22 of the bore 20, if the radius of the ball 90 is substantially the same as that of the radius 108, or if the radius of the ball 90 is slightly less than the radius 108, there in contact between the ball 90 and the radius 108 within the radius portion 108. Again, depending on the distance between the bore 30 and the end 22, if the radius of the ball 90 is greater than the radius portion 108, then contact between the ball 90 and the shank 102 will probably be at the juncture of the radius 108 and the outer periphery of the rear portion 112 of the shank 102. The radius of the ball 90 is preferably the same as the radius 108, or slightly less.

To remove the tool bit 100 from the bore 20, the sleeve 60 is moved forwardly, as indicated by the large arrow on the sleeve 60 in FIG. 5C. A forward biasing pull is placed on the tool bit 100 at the same time that the sleeve 60 is moved forwardly. This is shown in FIG. 5C by the large arrow on the tool bit 100. As the tool bit 100 is moved forwardly, the radius 108 of the groove 104 causes the ball 90 to be cammed upwardly within the radial bore 30 and upwardly within the conical bore 74 and the cylindrical bore 76. This is shown in FIG. 5C by the large arrow on the ball 90. When the ball 90 completely clears the bore 20, the tool 100 is free from the ball and is thus able to be removed from the bore 20. After the tool is removed from the bore 20, the sleeve 60 may be released, and the ball 90 will be cammed downwardly into the radial bore 30 and partially into the hexagonal bore 20, as shown in FIG. 5A.

Returning again to FIG. 5B, arrows illustrating the frictional and normal forces which are involved in the locking of the power bit 100 in the tool 10, are shown. It will be remembered that the drawing comprises a two-dimensional representation, while the actual elements involved are three-dimensional, and circular surfaces are involved. Accordingly, there is actually only single point contact between the ball 90, the radius 108 of the tool shank 102, and both the bore 30 of the spindle 12 and the conical bore 74 of the sleeve 60. It will also remembered that the bore 20 is hexagonal and that the shank 102, including its rear portion 112, is also hexagonal. Thus, the hexagonal or non-circular configuration of both the bore 20 and the shank 102 prevents relative rotation between the spindle 12, and accordingly of the tool 10, and the power tool bit 100.

In FIG. 5B, the point of contact between the ball 90 and the radius 108 of the groove 104 in the shank 102 of the tool 100 is identified by the letters PC. If the power bit 100 gets caught or hung up in some manner in a fastener, there will be a longitudinally outward pull on the tool 100 that is transferred from the power bit 100 to the tool 10 through the ball 90. The ball 90, in response to the outward pull, moves only a distance equal to the difference between its diameter and the diameter of the bore 30. And that difference, as stated above, is very small. The tool bit 100 also moves that same distance. For all practical purposes, the ball and the tool bit do not move; rather, they remain locked together in the spindle 12 of the handle apparatus 10.

The pulling force exerted by the tool 100 is identified in FIG. 5B by the arrow identified as $F_P$. The pulling force $F_P$ is, of course, opposed by an equal and opposite force acting through the ball 90 and against the tool through the point of contact PC. In addition to this opposing force acting in the longitudinal or axial direction, the reaction of the ball against the tool will have a force component in the radial direction towards the axis of the tool. The reaction forces against the tool 102, the spindle bore 30, and conical sleeve bore 74 are shown by arrows in FIG. 5B. The arrows are for illustrative purposes only, and are not scaled to each other.

For illustrative purposes, as shown in FIG. 5B, the static analysis, based on the summation of orthognal forces and moments about a center, gives the following relationships between the pull force $F_P$ and the various reaction forces:

| | | | | | |
|---|---|---|---|---|---|
| $F_{NT} =$ | 1.20 $F_P$ | $F_{NS} =$ | .40 $F_P$ | $F_{NB} =$ | .90 $F_P$ |
| $F_{TT} =$ | .15 $F_P$ | $F_{TS} =$ | .12 $F_P$ | $F_{TB} =$ | .27 $F_P$ |

In the above notation, "F" refers to the various forces. The first subscript "N" refers to normal forces and the first subscript "T" refers to tangential forces. For the second subscripts, "T" refers to the tool 100, "S" refers to the sleeve 60, and "B" refers to the spindle 12.

The reaction tangential force $F_{TS}$ on the conical surface 74 of the sleeve 60 tends to cause the sleeve 60 to be moved to the left in FIG. 5B. This force, as well as the other reaction forces, is observed to be proportional to the pull force on the tool 100, thus increasing with increases in $F_P$. The proportionality factors are a function of the dimensional and material parameters of the embodiment. This tangential reaction force $F_{TS}$ thus causes a "frictional backlash" resulting or causing a jamming action to hold the tool in place.

It will be noted that in FIG. 5A there is shown a space between the ball and the right side of the radial bore 30. When a pulling force is applied on the power bit 100 to the right as shown in FIGS. 5B and 5C, i.e., an outward pulling force, the ball 90 contacts the right side or front portion of the radial bore 30, as shown in FIG. 5C. When the power bit 100 is inserted into the bore 20, and while the power bit is in use in the tool apparatus 10, the ball 90 will be contacting the left or rear side of the bore 30, as shown in FIG. 5B. However, when an outward pull is exerted on the tool 100, as when the tool gets caught on a fastener, then there will be a displacement of the ball from the rear portion of the bore 30 to the front portion of the bore 30, which is a slight displacement to the right as shown in FIGS. 5A, 5B, and 5C. This displacement is shown in FIG. 5C, where the ball 90 is contacting the front or right side of the bore 30, and the ball 90 is accordingly spaced slightly from the left or rear portion of the bore 30. However, as stated earlier, the diameter of the bore 30 is only slightly larger than the diameter of the ball 90, and the displacement of the ball from one side of the bore to the other is virtually unnoticeable.

While power bits complying with the ANSI specification referred to above have been discussed herein, and are illustrated in the drawing, it is obvious that the apparatus of the present invention will work with any bit having a non-circular shank configuration and with a groove extending circumferentially about the shank such that the radius of the groove, or the width of the groove along with radius portions thereof, allows a ball, having about the same radius as that of the groove, to extend into the groove. The phrase "about the same radius" encompasses the three examples of ball radii as discussed above, namely substantially the same as, slightly larger than, and slightly less than, the radius of the groove. Similarly, the reference to the diameter of the ball 90 being "substantially the same as" that of the radial bore 30 refers to the fact that the diameter of the ball 90 is slightly less than the diameter of the bore 30, so that the ball 90 moves freely in the bore 30, but that the difference in the diameters is minimal so that there is no appreciable or noticeable longitudinal movement of the power bit 100 in the bore 20 as a longitudinally axial pull is placed on the bit 100 and the ball 90 shifts from bearing against the rear wall of the bore 30 to bearing against the front wall of the bore 30.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Hand tool apparatus including a handle for a tool bit having a non-circular shank and having a groove extending circumferentially about the shank with a flat center portion and a radiused portion on the groove, comprising, in combination:

spindle means including a non-circular bore having an inner end for receiving the non-circular shank of the tool bit, a radial bore communicating with the non-circular bore, and a ball having a radius substantially the same as, or slightly less than, the radiused portion of the groove of the tool bit disposed in the radial bore and extendable into the non-circular bore and against the radiused portion of the groove of the shank of the tool bit for locking the tool bit within the non-circular bore and against the inner end of the non-circular bore;

sleeve means disposed about the spindle means, and including a front bore disposed about the spindle means, a conically tapered bore disposed adjacent to the radial bore and disposed against the ball, and a rear bore adjacent to the conically tapered bore for receiving the ball when the ball is moved out of the non-circular bore; and spring means for biasing the sleeve means against the ball whereby the conically tapered bore contacts the ball to apply normal and tangential forces against the radiused portion of the shank to lock the bit in the non-circular bore and against the inner end of the non-circular bore to prevent longitudinal movement of the tool bit.

2. The apparatus of claim 1 in which the sleeve means includes a shoulder adjacent to the front bore, and the spring means is disposed against the shoulder to bias the sleeve means against the ball.

3. The apparatus of claim 2 in which the spindle means includes a cylindrical portion, and the spring means is disposed about the cylindrical portion.

4. The apparatus of claim 3 in which the spindle means further includes bearing means against which the spring means bears.

5. The apparatus of claim 4 in which the bearing means comprises a shoulder against which the spring means bears.

6. The apparatus of claim 4 in which the bearing means comprises a washer disposed about the cylindrical portion and against which the spring means bears.

7. The apparatus of claim 4 in which the front bore of the sleeve means is disposed about the cylindrical portion and the bearing means of the spindle means, and the spring means is disposed about the cylindrical portion of the spindle means and extends between the bearing means and the shoulder of the sleeve means.

8. The apparatus of claim 3 in which the diameter of the ball is greater than the thickness of the spindle means between the noncircular bore and the cylindrical portion.

9. The apparatus of claim 8 in which the spindle means further includes retainer means at the juncture of the radial bore and the noncircular bore to retain the ball at least partially within the radial bore when the bit is removed from the noncircular bore.

10. The apparatus of claim 1 in which the radius of the ball is about the same as the radius of the radiused portion of the groove of the bit shank.

11. The apparatus of claim 1 in which the spindle means further includes ring means for limiting the movement of the sleeve means under the bias of the spring means when a bit is removed from the noncircular bore.

12. The apparatus of claim 1 in which the diameter of the ball is substantially the same as the diameter of the radial bore to prevent noticeable movement of the ball and the tool bit when an axial pull is placed on the tool bit.

13. Adapter apparatus for holding a tool bit having a shank and a circumferentially extending groove with a radiused portion and a flat portion, comprising, in combination:

spindle means, including
a first bore, having an inner end, for receiving the shank of the tool bit,
a radial bore communicating with the first bore, and
a ball having a radius substantially the same as the radiused portion of the groove of the shank of the tool bit and extendable into the first bore and against the radiused portion of the groove of the shank of the tool bit for locking the tool bit within the first bore and against the inner end of the first bore;

sleeve means disposed about the spindle means, and including
a front bore extending about the spindle means,
a conically tapered bore disposed adjacent to the radial bore and against the ball, and
a rear bore adjacent to the conically tapered bore for receiving at least a portion of the ball when the ball is moved out of the first bore for inserting and removing the tool bit; and spring means for biasing the sleeve means against the ball to caused the conically tapered bore to contact the ball to apply normal and tangential forces against the radiused portion of the groove of the tool bit shank to lock the tool bit in the first groove and against the inner end of the first bore to prevent longitudinal movement of the tool bit.

14. The apparatus of claim 13 in which the spindle means further includes a cylindrical portion, and the spring means is disposed about the cylindrical portion.

15. The apparatus of claim 14 in which the spring means comprises a compression spring extending between the spindle means and the sleeve means.

16. The apparatus of claim 15 in which the spindle means further includes bearing means against which the compression spring bears.

17. The apparatus of claim 16 in which the sleeve means further includes shoulder means, and the compression spring bears against the shoulder means to bias the conically tapered portion against the ball.

18. The apparatus of claim 17 in which the diameter of the radial groove is substantially the same as the diameter of the ball to prevent noticeable axial movement of the ball and of the tool bit when an axial pull is placed on the tool bit.

19. The apparatus of claim 18 in which the spindle means further includes means for retaining the ball at least partially in the radial bore when the tool bit is removed from the first bore.

* * * * *